Sept. 20, 1955

A. E. CARLSON 2,718,254

APPARATUS FOR AND METHOD OF PRODUCING
REINFORCED SHEET MATERIAL

Filed Aug. 9, 1950

INVENTOR.
Arthur E. Carlson
BY
Dybvig & Dybvig
His ATTORNEYS

Sept. 20, 1955  A. E. CARLSON  2,718,254
APPARATUS FOR AND METHOD OF PRODUCING
REINFORCED SHEET MATERIAL
Filed Aug. 9, 1950  6 Sheets-Sheet 2

INVENTOR.
Arthur E. Carlson
BY
Dybvig & Dybvig
HIS ATTORNEYS

Sept. 20, 1955

A. E. CARLSON 2,718,254

APPARATUS FOR AND METHOD OF PRODUCING
REINFORCED SHEET MATERIAL

Filed Aug. 9, 1950

INVENTOR.
Arthur E. Carlson
BY
Dybvig & Dybvig
HIS ATTORNEYS

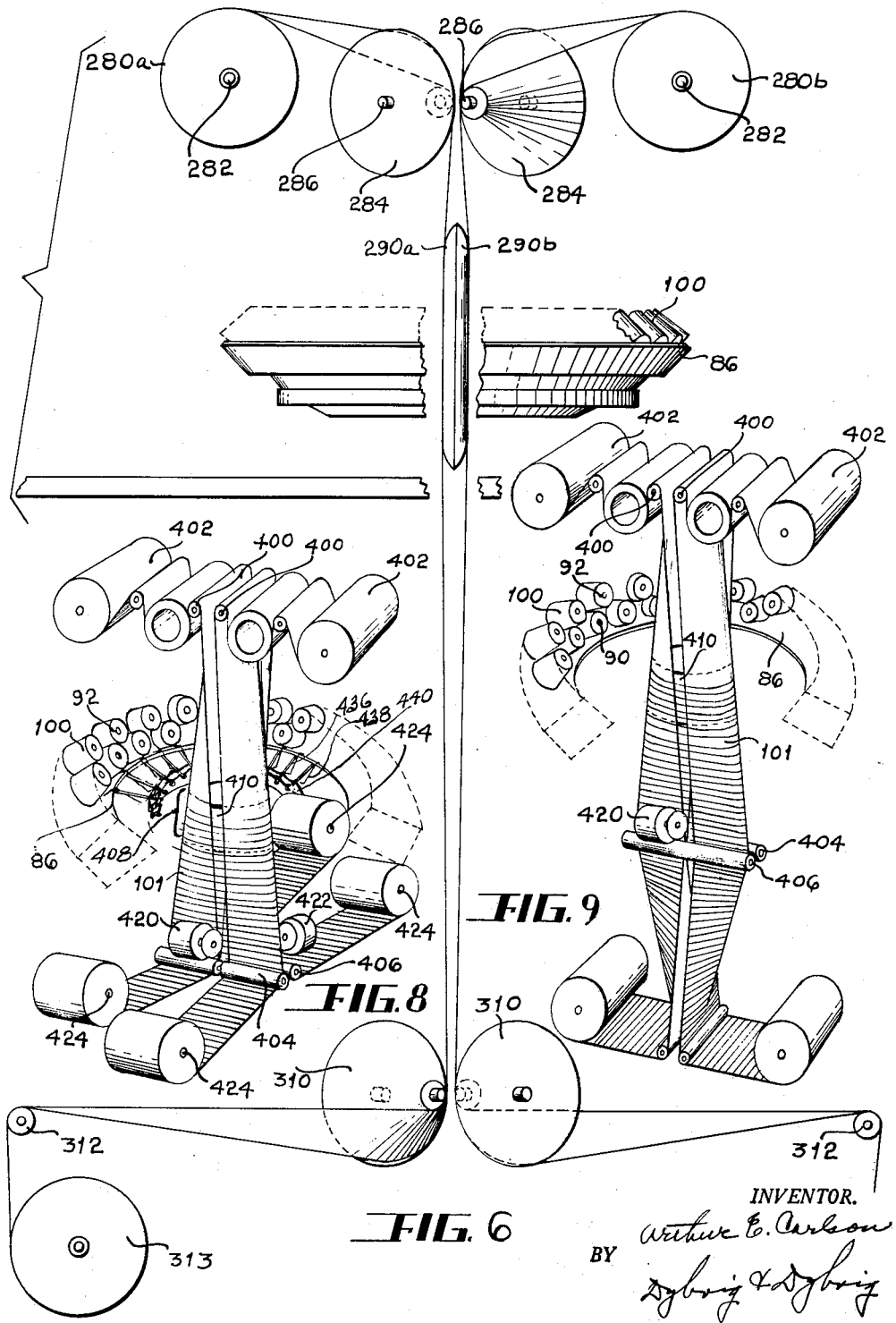

Sept. 20, 1955  A. E. CARLSON  2,718,254
APPARATUS FOR AND METHOD OF PRODUCING
REINFORCED SHEET MATERIAL
Filed Aug. 9, 1950  6 Sheets-Sheet 5

INVENTOR.
Arthur E. Carlson
BY
Dybvig & Dybvig
HIS ATTORNEYS

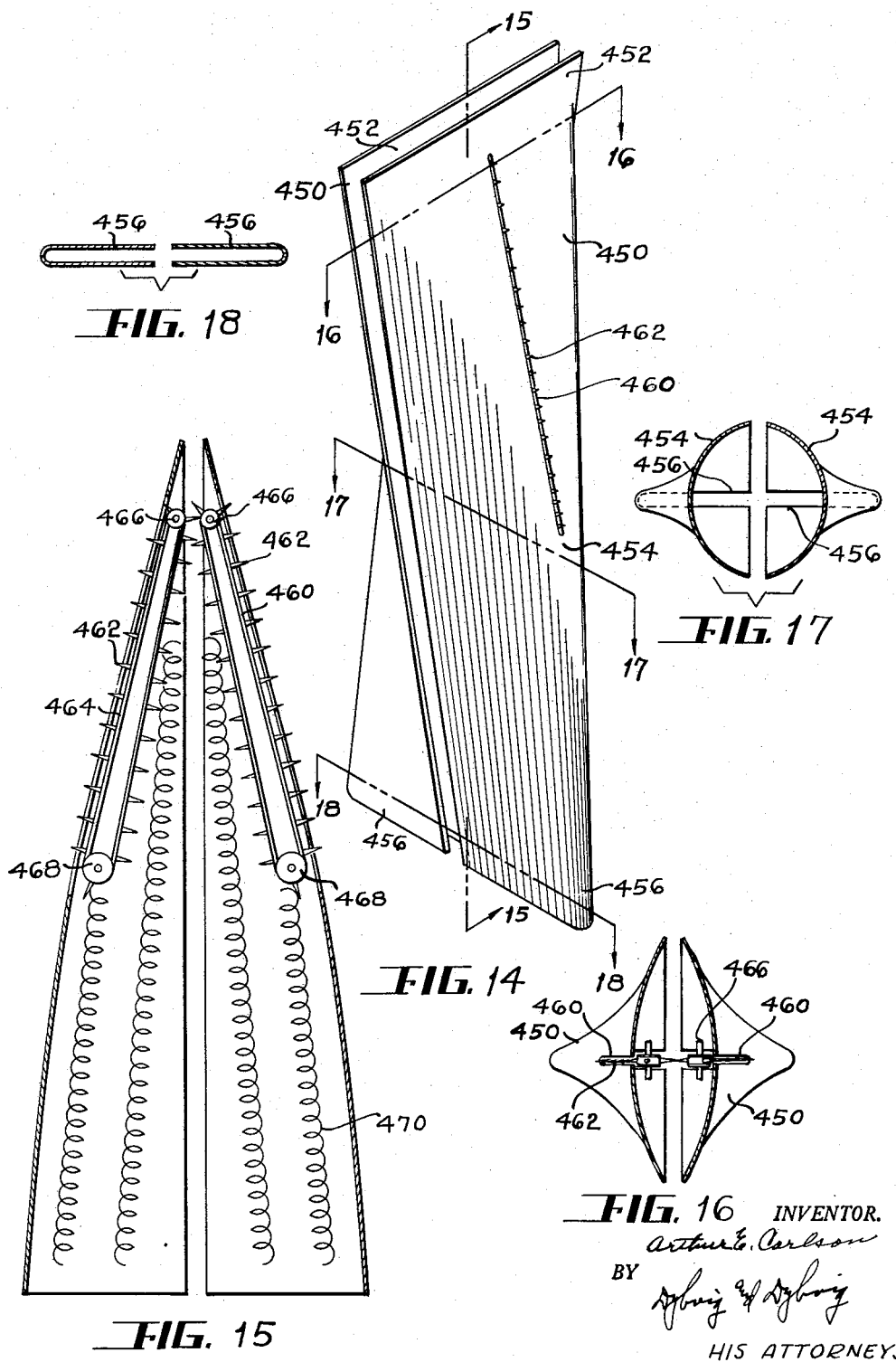

United States Patent Office 2,718,254
Patented Sept. 20, 1955

2,718,254

APPARATUS FOR AND METHOD OF PRODUCING REINFORCED SHEET MATERIAL

Arthur E. Carlson, Troy, Ohio

Application August 9, 1950, Serial No. 178,434

67 Claims. (Cl. 154—1.7)

This invention relates to apparatus for and method of producing reinforced sheet material.

In the manufacture of sheet material wherein strength is essential, the item of cost is very important, especially in some industries, for the reason that huge quantities of such material is used. For example, in the manufacture of cartons made from corrugated paper, cardboard and the like, tape is used for holding the seams together. On some types of cartons, woven material having suitable adhesive applied to one side thereof is used for overlapping the seams and retaining the parts in position. This material is expensive. In lighter weight cartons and boxes, paper having applied thereto an adhesive material is used for securing the parts together. If a light weight paper is used, there is danger of failure. For many purposes the light weight paper is apt to be inadequate, in which event it is necessary to resort to either a woven fabric or a heavy weight paper having the desired strength. In either case, the cost becomes a very important item.

The device disclosed herein may be used in manufacturing reinforced sheet material disclosed in my copending applications for United States Letters Patent Serial No. 109,482, filed August 10, 1949, for Reinforced Paper Articles, now Patent 2,610,936, and Serial No. 140,532, filed January 25, 1950, for Reinforced Sheet Material, Apparatus for and Method of Producing the Same, now abandoned, which reinforced sheet material may be used in the manufacture of boxes, cartons, crates, et cetera.

An object of this invention is to provide apparatus for and method of producing the reinforced sheet material disclosed in the aforementioned applications for United States Letters Patent.

Another object of this invention is to produce an apparatus for laying reinforcing ribbons or elements in equally spaced parallel relation transversely across a sheet of material, or rather, a pair of sheets of material, the apparatus being provided with mechanism which permits contraction of the reinforcing elements after they have been placed in position without the reinforcing elements being shorter after contraction than the width of the sheet material.

Another object of this invention is to feed strip material vertically and continuously through a device for laying the reinforcing elements in position, the reinforcing elements being placed in equally spaced relation.

Another object of this invention is to provide a horizontal, rotatable support loaded with a large number of bobbins, each containing a reinforcing element, the reinforcing elements having applied thereto adhesive material after leaving the bobbins but before being wrapped in position upon the sheet material, the sheet material being fed in at an angle so that as the reinforcing elements are wrapped upon the sheet material, the reinforcing elements extend at substantially right angles to the longitudinal length of the sheet material, the angle at which the sheet material is fed being adjustable to permit the feeding of the sheet material at various relative speeds with respect to the speed at which the bobbins or spools travel around the sheet material, the reinforcing elements being severed between adjacent sheets shortly after the reinforcing elements are placed in position so as to permit the reinforcing elements to contract while the adhesive material cures, the sheet material and the reinforcing elements together with the adhesive material being heated, so as to expedite the curing of the adhesive material.

Another object of this invention is to provide a device for placing reinforcing elements upon the surface of sheet material wherein the reinforcing elements are applied from a plurality of bobbins horizontally mounted for rotation about the sheet of material, the reinforcing elements upon leaving the bobbins being passed through adhesive which rotates about the sheet material in a movable toroidal pot to thereby supply adhesive material to the reinforcing elements before the reinforcing elements come into contact with the sheet material.

Another object of this invention is to feed sheet material unwound from a roll past a reinforcing station to another station, past which the sheet material is fed in a folded relation, the reinforcing station being located in the proximity of a position where the sheet material is curved into a substantially semi-circular curvature.

Another object of this invention is to feed a pair of sheets of material, each sheet being fed from a flat position into a folded position, the folds opening toward each other to thereby cause the sheets between the flat position and the folded position to form a substantially curved loop supported upon the mandrel in the vicinity of apparatus for applying reinforcing elements to the sheets.

Another object of this invention is to guide the reinforcing elements in paths such that the reinforcing elements are placed in straight rows or lines across the sheet material and at right angles thereto.

Other objects and advantages reside in the construction of parts, the combination thereof and the mode of operation, as will become more apparent from the following description.

Referring to the drawings,

Figure 6 is a side elevational view of the modification disclosed in Figure 5.

Figure 8 discloses a modification wherein the path of the sheet is shown advancing from a flat position into a folded position and then severed and re-reeled.

Figure 9 is another modification similar to Figure 8, showing a sheet being fed from flat position into folded position, then advanced from the folded position into the flat position.

Figure 4:
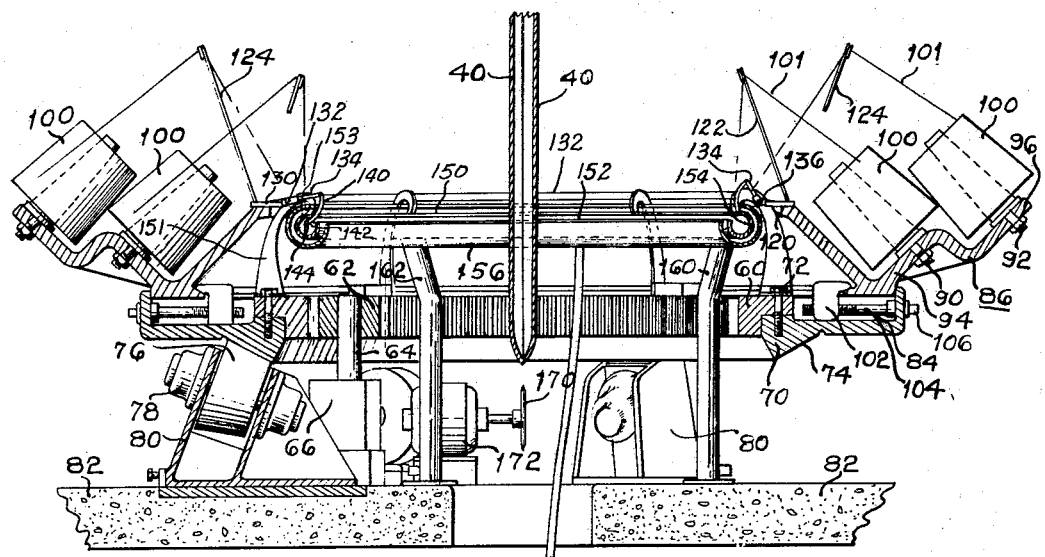
Figure 4 is a cross sectional view taken substantially on the line 4—4 of Figure 1.
Figure 5:
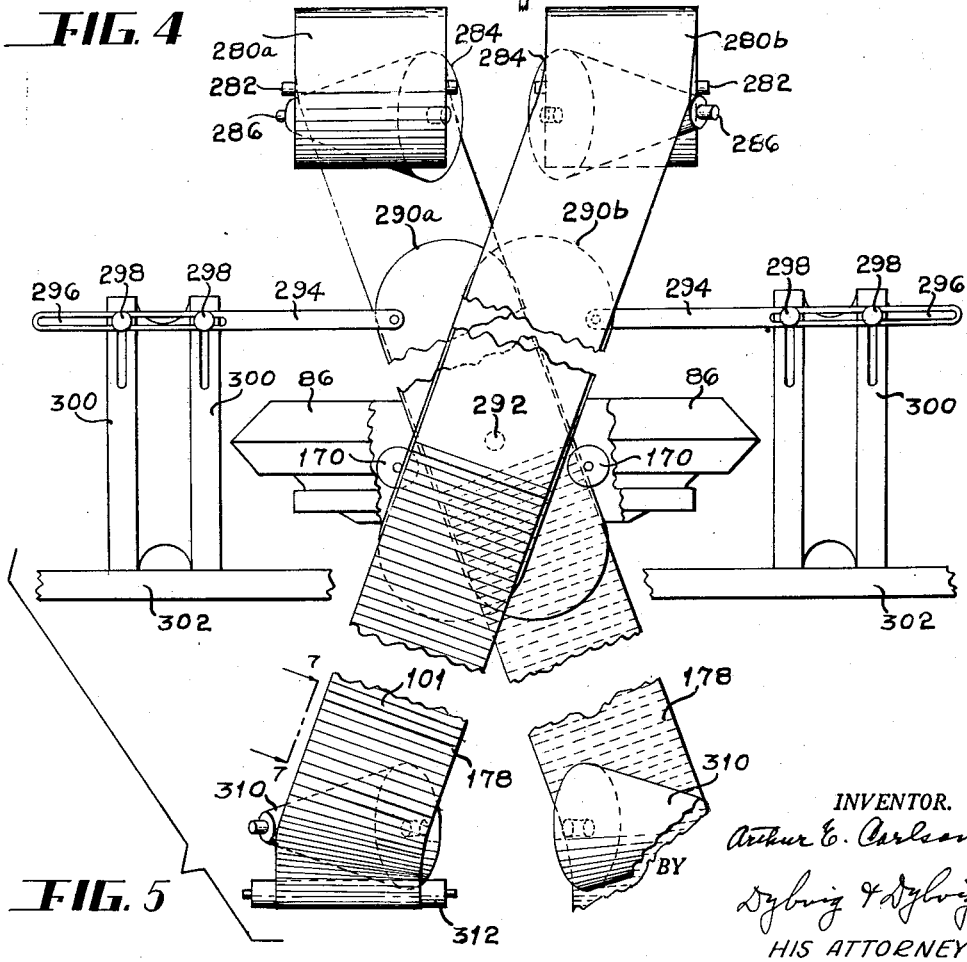
Figure 5 is a front view of a modification.
Figures 10, 11:
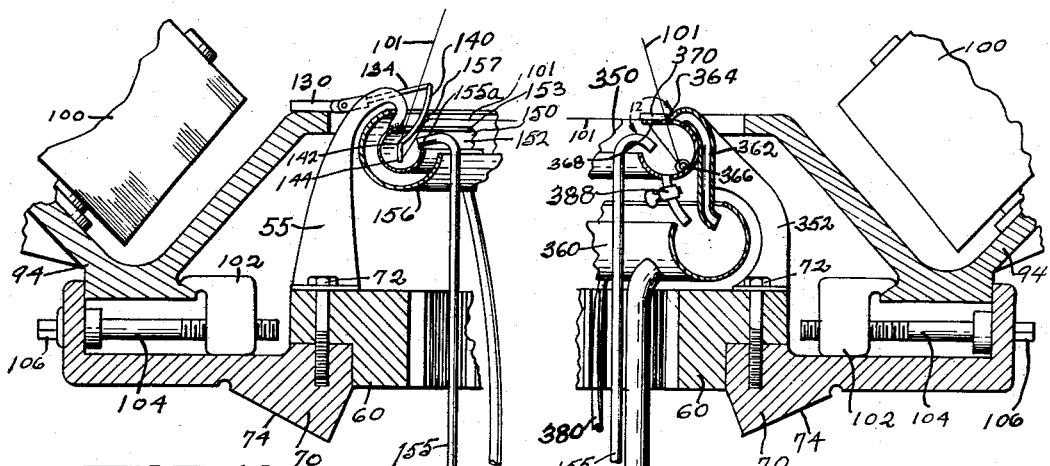

Figure 10 is an enlarged cross sectional view of the parts shown to the left of Figure 4.

Figure 11 is a fragmentary, cross sectional view of a modification disclosing a rotatably mounted adhesive container that may be heated, together with a stationary reservoir.

Figure 12:

Figure 12 is a fragmentary cross sectional view taken substantially on the line indicated by the arrows 12—12 of Figure 11.

Figure 13:
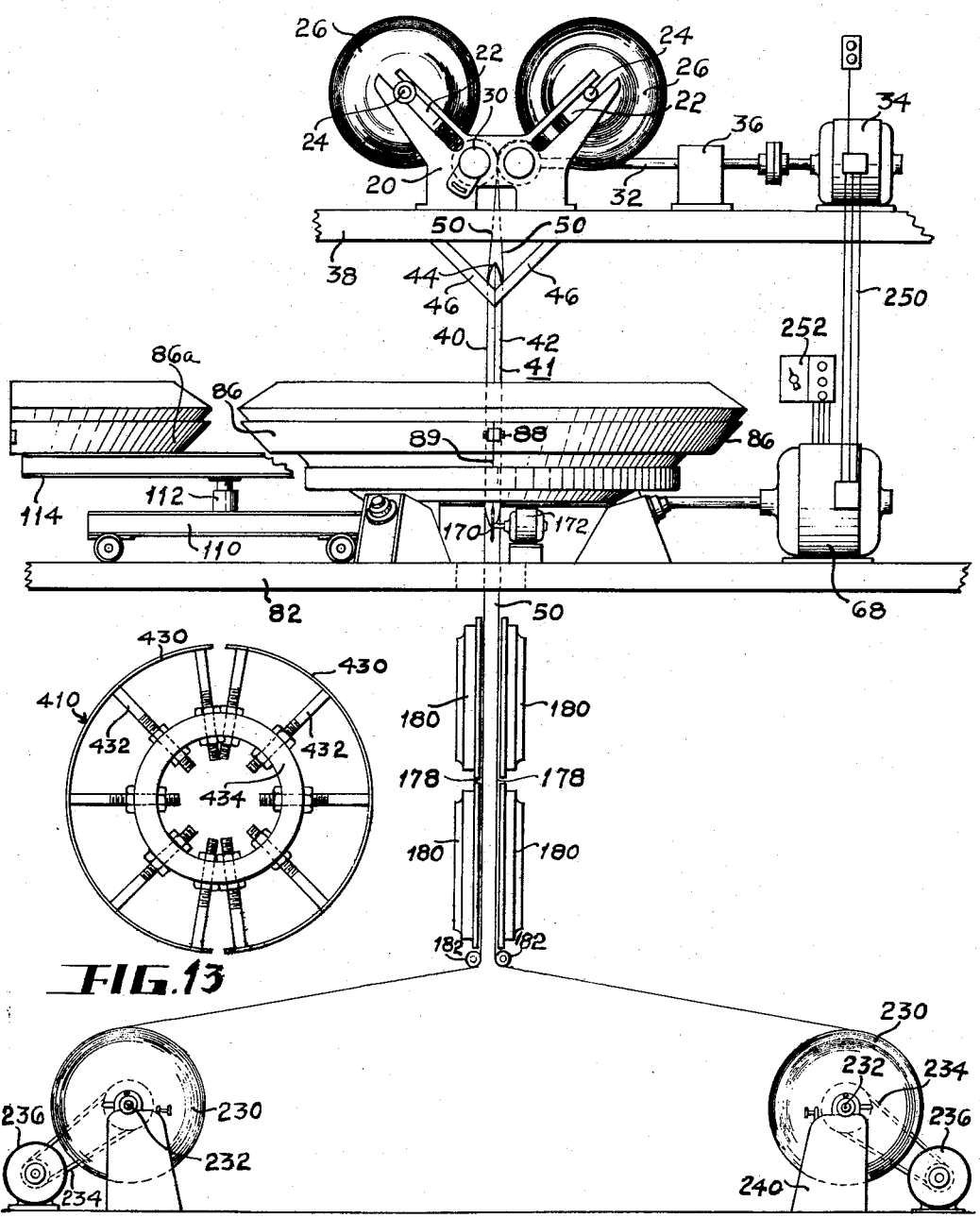

Figure 13 is a top plan view of a mandrel that may be used in connection with the modification disclosed in Figures 8 and 9.

Figure 14 discloses a mandrel or a support for sheet material withdrawn over rolls.

Figures 15, 16, 17 and 18 are cross sectional views taken substantially on the section lines 15—15, 16—16, 17—17 and 18—18 respectively of Figure 14.

Figure 19:
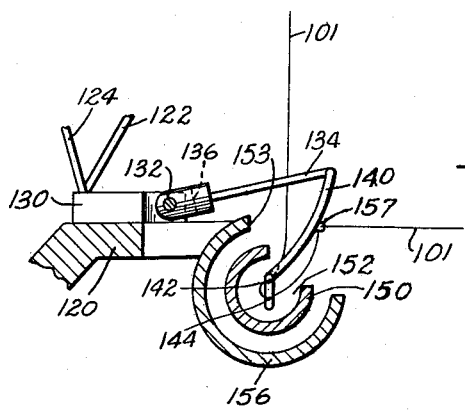

Figure 19 is an enlarged view of a fragment of Figure 10.

The device for manufacturing the reinforced sheet material includes sheet material unreeling mechanism, sheet material supporting mandrel, ribbon applying or wrapping mechanism, adhesive carrying and applying mechanism, driers for curing the adhesive and a reeling mechanism for winding the reinforced sheets into rolls. Each of these will now be described.

Unreeling mechanism

The unreeling mechanism includes a pair of roll supporting devices 20, each provided with diagonally disposed slots 22 adapted to receive arbors 24 extending through the rolls 26 of paper or other sheet material. The rolls 26 of sheet material are supported upon the arbors 24 adapted for sliding and rotating movement in the slots 22. The rolls of paper are also supported upon a pair of feed rollers 30 driven through a suitable gear mechanism by a shaft 32 from a motor 34 through a suitable speed reducing mechanism 36. Two rollers 30 are mounted in close proximity to each other, so that as the sheet material is unwound from the rolls 26, the sheet material passes over the rollers 30 and between the rollers so as to be fed downwardly through a slot provided therefor in a support 38, which may represent a floor or any other suitable support, supported in any suitable manner. Due to the fact that the sheet material is quite wide, the support 38 must be located a considerable distance above the ribbon applying mechanism, in order to cause the sheet material to be formed into the proper curvature that takes place upon a mandrel, which will now be described.

Sheet material supporting mandrel

Figure 1:
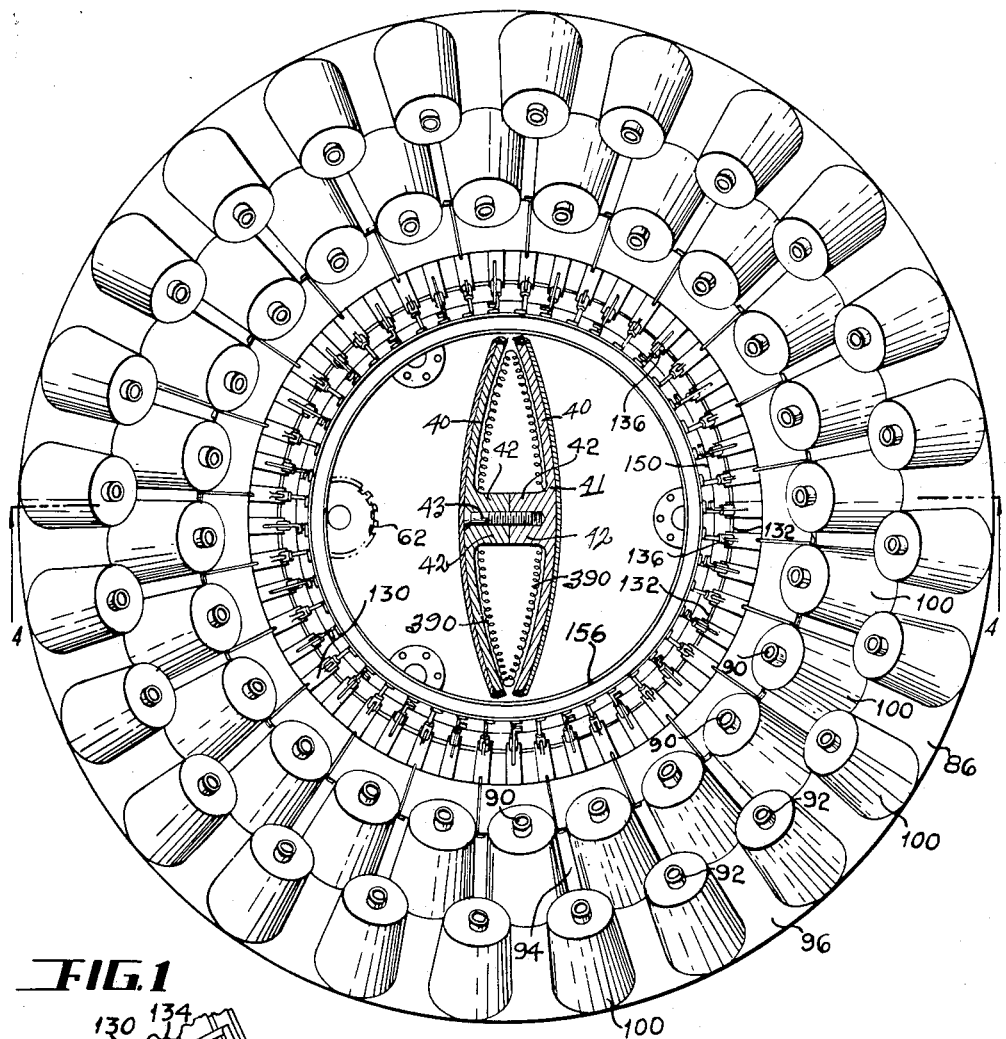
Figure 1 is a top plan view of the device for laying the reinforcing elements in position, showing the mandrel in cross section.
Figure 2:
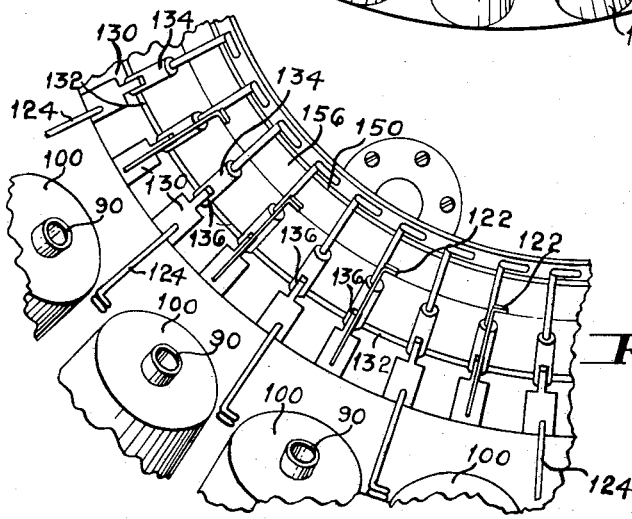
Figure 2 is a fragmentary, enlarged view of a portion of the device disclosed in Figure 1.
Figure 3:
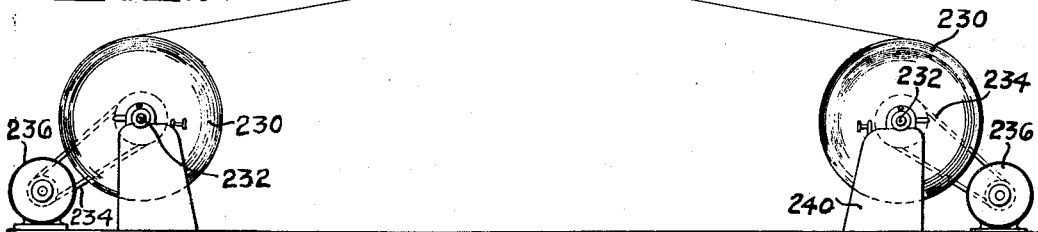
Figure 3 is a side elevational view of a device for laying the reinforcing elements in position.

The sheet material supporting mandrel 41, shown in Figures 1, 3 and 4, consists of a pair of curved plate members 40, secured together by a screw or bolt 43 extending through one hub portion 42 and threadedly engaging the other hub portion 42, and terminates in arcuate portions 44. The mandrel is supported by V-brackets 46 attached to a support 38. After the sheet material 50 passes between the rollers 30, the two sheets are separated so that one is located on one side of the mandrel 41 and the other is located on the opposite side of the mandrel. As the sheets 50 advance over the mandrel, they eventually are curved, so as to have a curvature corresponding to the curvature of the mandrel. The width of the sheet is slightly greater than the width of the mandrel, for reasons that will appear more fully later. This difference between the width of the sheets and the width of the mandrel is best seen in Figure 1. The mandrel 41, together with the sheets of material to be reinforced, extends downwardly through a ribbon applying or wrapping mechanism.

In the embodiment shown in Figures 1 to 6, the sheet material is only slightly curved at the station where the reinforcing elements are applied. For accurate workmanship and a uniform product it would be preferable to have the sheets curved, so that the reinforcing elements are laid in position while the sheet material is in a substantially cylindrical form. This has been disclosed and will be described in connection with the modification disclosed in Figures 8 and 9, which will be more fully described hereinafter.

Ribbon applying or wrapping mechanism

The ribbon applying mechanism includes an internally toothed gear member 60, driven by a pinion 62 keyed to a shaft 64 projecting upwardly from a gear reducing box 66 driven from an electric motor 68. The gear member 60 has fixedly attached thereto a ring 70 by means of a plurality of bolts 72. The ring 70 is provided with an annular bevelled surface 74 (Figure 4), forming a race resting upon a plurality of conical rollers or bearings 76 journalled upon a shaft 78, mounted in a bracket 80 resting upon the support or floor 82. At least three or more of these roller bearings are required to support the internally toothed gear member 60 and the ring 70. The ring 70 is provided with an annular channel 84 adapted to support a pair of semi-circular bobbin supporting members 86. The two halves forming the bobbin supporting ring are held together by suitable bolts 88 extending across the seam 89 between the two members 86. Each member 86 supports a plurality of diagonally disposed spindles 90 and 92, the spindles 90 extending through suitable apertures in the annular inclined portion 94 of member 86. The spindles 92 extend through suitable apertures in the annular inclined portion 96 of member 86. Each of the spindles 90 and 92 supports a spool or bobbin 100 containing a ribbon or a reinforcing element 101. Each of these reinforcing elements consists of a plurality of filaments that may be made from synthetic material, such as rayon or nylon.

The material wound upon the spools or bobbins need not necessarily consist of the reinforcing elements described in my copending applications but may consist of any other type of reinforcing members for use in reinforcing the sheet material, as for example, cord, string, yarn, thread or other types of material, as the particular type of reinforcing elements is immaterial as far as the operation of this device is concerned. The semi-cylindrical supporting members 86 are mounted in the channel 84 and clamped into position by a clamping member 102 tightened in position by bolts 104 having a wrench engaging portion 106, mounted on the outer periphery of the ring 70.

An inwardly directed semi-annular flange 120 supports a plurality of resiliently mounted tensioning arms 122 and 124, the arms 122 being used in connection with the reinforcing elements 101 withdrawn from the bobbins 100 mounted on the spindles 90 and the arms 124 being used in connection with the reinforcing elements withdrawn from the other series of bobbins.

Bosses 130 mounted upon both members 86 have rotatably mounted therein a flexible shaft 132, there being one flexible shaft for each of the semi-circular members 86. This flexible shaft may be made from resilient material such as rubber or any other suitable material. The flexible shaft may be rotated through an angle of 45°, more or less. A plurality of arms 134, one for each of the bosses 130, are each provided with a bifurcated end 136, each furcation being provided with an aperture through which the flexible shaft 132 passes. The furcations straddle the bosses 130 and are fixedly attached to the flexible shaft 132. By this arrangement, it is possible to adjust the angular position of the arms 134 by merely rotating the flexible shaft 132.

Adhesive carrying and applying mechanism

The outer end of each arm 134 has fixedly attached thereto a curved arm 140 (Figures 10 and 19), provided with an eye 142 and a second eye 144 through which the reinforcing elements 101 pass, there being one reinforcing element for each arm 134. When the arms 134 are actuated into the position shown to the left of Figure 4, the eyes 142 and 144 are located in a toroidal adhesive container or pot 150, mounted upon substantially C-shaped brackets 151 fixedly attached to the gear 60. The adhesive pot is generated by a substantially C-shaped generatrix traveling through a circular path. The C is slightly tilted, so that one edge of the opening of the adhesive pot is located substantially above the center of the adhesive pot and the other edge down from the center of the inner side of the adhesive pot to provide an annular opening 152. The adhesive pot is mounted for rotation with the gear 60 and parts attached thereto. In the event the adhesive pot 150 is stationary, then the adhesive will be rotated by arms 134 and 140 acting as paddles, as disclosed in my copending joint application with Joseph Baxter, Jr., Serial No. 179,302, filed August 14, 1950, now Patent No. 2,699,813. Whether the adhesive pot is stationary or rotary, the adhesive, due to the centrifugal force of a rotating body, will tend to move outwardly and upwardly. That being the case, the mouth 152 is angularly disposed, so as to provide a lip 153, preventing the adhesive from flowing over the edge of the adhesive pot 150 until the desired volume has been added to the pot.

An overflow reservoir 156, substantially toroidal in shape, is fixedly mounted on vertical tubes 160 and 162, so as to enclose the adhesive pot 150. Whenever the adhesive material in the pot 150 overflows, the adhesive material spills into the reservoir 156, from which it is drained through the tubes 160 and 162 which thus form drainage conduits for the reservoir. Adhesive material is supplied to the pot 150 through a pipe 155 (Figure 10) terminating in a nozzle 155a projecting into the annular opening 152 and located in such a position that the pipe 155 clears the reinforcing elements as they pass into the pot and out again, as will appear more fully later. This arrangement is desired to provide a control on the volume of adhesive in the pot 150 and to provide a means for replenishing the supply of adhesive as it is being used. An eye 157 (Figures 10 and 19) on each arm 140 is used for guiding the reinforcing elements in a path that clears the nozzle 155a of the supply pipe 155.

The adjustable guide arms cause the reinforcing elements to pass through the adhesive material irrespective of the position of the adhesive material in the pot 150. It can be readily seen that the top of the adhesive in the pot 150 is level when the pot stands still and the adhesive material therein stands still. When the pot begins rotating, or in the event of a stationary pot when the adhesive material begins circulating in a circular path, the surface of the adhesive material changes into an angular position, depending upon the force exerted by centrifugal force. Theoretically, the surface of the adhesive material would approach a vertical surface. The guide arms are so positioned when mounted in the pot 150, that irrespective of the position of the surface of the adhesive material, the reinforcing elements are guided through the adhesive material. In the event a stationary adhesive pot 150 is attached to the vertical tubes 160 and 162, the adhesive will be rotated by the guide arms 134 functioning as paddles, rotating at the same speed as the bobbins. The adhesive in the pot 150 will then flow through a substantially circular stream acted upon by centrifugal force, so as to cause the adhesive material to overflow over the top edge of the toroidal pot 150 in the event too much adhesive is applied to the pot. The toroidal overflow reservoir would then be so positioned as to catch the adhesive spilling over the edge of the adhesive pot 150.

Although the adhesive pot has been shown as toroidal, it could be any other suitable shape. Instead of one adhesive pot, two or more could be used. These could be interconnected, so as to maintain the desired quantity of adhesive.

The sheet material is gradually fed over the mandrel 41 at a constant rate of speed. While this takes place, the gear member 60 and the parts supported thereby are rotated, so as to wind the reinforcing elements around the sheet material and the margin of the mandrel 41, the reinforcing elements having first been secured in any suitable manner to the sheet material. The reinforcing elements cause the sheet material to be pressed against the mandrel, thereby causing the sheet material to have the same curvature as the underlying contour of the mandrel. The reinforcing elements passing through the adhesive material in the pot 150 are treated with adhesive material. As a matter of fact, the adhesive material is preferably of such a consistency that the adhesive material is drawn by capillary attraction between the interstices between the filaments constituting each reinforcing element. The operation continues until it is necessary to stop the machine, either to replenish the supply of paper or to replenish the exhausted supply of reinforcing elements on the bobbins. When the bobbins supported upon the members 86 are exhausted, a pair of like members 86a (only one of which has been shown) loaded with a new supply of bobbins may be substituted for the members 86 supporting the exhausted bobbins, in which connection reference is again made to my above noted joint application with Joseph Baxter, Jr. In order to maintain balance, the amount of material on the bobbins on one member 86 should be substantially equal to the supply of material on the bobbins on the other member 86.

Upon stopping the machine, it is desirable to first rotate the flexible shaft 132 through an angle sufficient to actuate the arms 134 and the parts carried thereby from the position shown to the left of Figure 4 to that shown to the right of Figure 4, so as to cause these parts to clear the adhesive pot. As a matter of fact, whenever stopping the machine, it is desirable to remove these parts from the adhesive pot so as to remove the reinforcing elements out of contact with the pot 150. After the reinforcing elements have been removed from the pot, it is merely necessary to remove the bolts 88 and loosen the bolts or screws 104 to release the clamping members 102 from the members 86 that are to be removed. Then, by lowering the rails 114 carried upon a truck 110 and moving the truck towards the center of the machine, so as to cause the rails 114 to be positioned under one of the members 86 that is to be removed, this member may be raised by means of the jack 112, the truck removed, the rails rotated through an angle of 180°, so as to substitute member 86a having a fresh supply of bobbins thereon in position. This operation is then repeated for the other member 86. The new members are clamped in position by tightening the bolts 104, so as to cause the clamps 102 to securely lock members 86 in position and by inserting the belts 88 so as to clamp the newly substituted members 86a to each other. The ends of the reinforcing elements are then secured to the ends severed from the exhausted bobbins, after which the flexible shafts are rotated so as to again dip the reinforcing elements into the adhesive pot. Instead of securing the ends of the new bobbins to the ends from the old bobbins, it may expedite matters to merely secure the ends from the new bobbins in any suitable manner to initiate the wrapping operation. The machine is then ready to be started again to continue the operation.

When the flexible shaft 132 is in the position shown to the left in Figure 4, the reinforcing elements are pulled through the eyes 142 and 144, so as to be drawn through the adhesive in the adhesive pot 150, the reinforcing elements upon leaving the adhesive pot passing through the eyes 157 on the arms 140. By this arrangement, the reinforcing elements do not come in contact with the adhesive pot although fed into the adhesive material.

The eyes 157, functioning as adhesive metering devices, are preferably of such dimension as to accommodate the reinforcing elements and positively limit the amount of adhesive material that can reach to the surface of the sheet material with the reinforcing elements. In other words, the eyes 157 function as wipers or metering devices. The reinforcing elements in passing from the eyes 157 are wrapped around the sheets of material passing over the mandrel 41. In Figure 1 there are approximately 48 bobbins, in other words, there are 48 sources of reinforcing elements. That being the case, 48 elements are wrapped around the sheet material for every revolution of the bobbins about the mandrel. If, for example, three reinforcing elements are desired for every inch of sheet material, the sheet material would then be required to advance sixteen inches downwardly over the mandrel for every revolution of the bobbins about the mandrel. If six ribbons are required per inch, then the sheet material would only advance eight inches for every revolution of the bobbins.

Rather than to change the relative speed of the sheet material and the rotary support for the bobbins, the spacing of the reinforcing elements may be changed by reducing or increasing the number of bobbins. If, for example, it is found desirable to provide reinforced sheet material with only half as many reinforcing elements, in other words, the reinforcing elements being spaced twice as far apart, the number of bobbins could be reduced in half; but in reducing the number of bobbins, the fact should not be overlooked that the reduction should be so made as to maintain balance. The bobbins are preferably diametrically disposed, so as to maintain balance. That being the case, it may be desirable to provide members 86 with additional apertures, so that instead of making provision for 48 bobbins, provision may be made for 32 bobbins, or any other suitable number, depending upon the requirements of the finished sheet material.

When using synthetic reinforcing elements or ribbons, it is a characteristic of some material, such as rayon for example, to shrink after being applied to the surface of the sheet material. This shrinkage is caused by moisture in the adhesive applied to the reinforcing elements. In order that the reinforcing elements shall extend from one edge of the sheet material to the opposite edge of the sheet material, it is necessary to provide reinforcing elements that are longer than the width of the sheet material. The sheet material preferably extends beyond the mandrel. For some types of reinforcing elements there may be provided a gap between the edges of the sheet material equal to five percent of the sheet material, over which gap the reinforcing elements extend. Furthermore, the reinforcing elements, upon being wrapped around the sheet material and the mandrel, are integral. That being the case, a pair of rotary cutting discs 170, shown in Figures 3 and 4, each driven by a motor 172, are used in cutting the reinforcing elements so as to sever the reinforcing elements extending from one sheet to the other. Upon the reinforcing elements being cut, the reinforcing elements are permitted to shrink without wrinkling or crumbling the sheet material. By providing a proper sized gap, the reinforcing elements upon shrinking will have a width substantially equal to the width of the sheet material. By providing an adjustment of the mandrels with respect to each other, the gap between the sheets may be adjusted to either increase or decrease the length of the reinforcing elements spanning the gap, so that upon shrinkage the ends of the reinforcing elements will terminate in the margins of the sheet material.

Driers for curing the adhesive

The strips of sheet material 50, provided with reinforcing elements or ribbons, are fed downwardly between heaters 180 that may be any suitable type of heater for curing the adhesive material.

Figure 7:
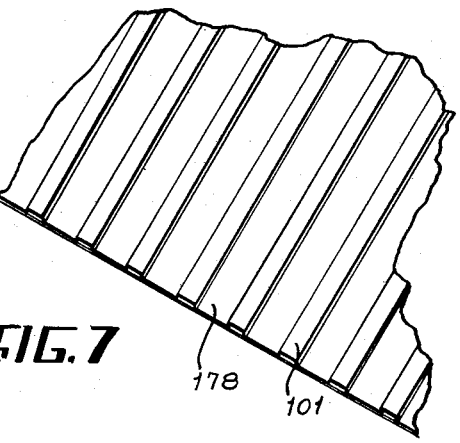
Figure 7 is a fragmentary, cross sectional view, taken substantially on the line 7—7 of Figure 5.

The reinforcing elements protrude outwardly from the sheet material. Due to the fact that it is desirable when using the reinforced sheet material for sealing boxes and the like that the reinforcing elements be in contact with adhesive that is in contact with the surface of the carton, the outer or exposed surface of the reinforcing elements should be flush with the sheet material extending between adjacent reinforcing elements. The reinforcing sheet material 178, as it appears after it has been applied in position, is shown in Figure 7. The reinforcing elements 101 are located on one side of the sheet material.

Reeling mechanism

The sheet material is reeled into a roll 230 mounted on an arbor shaft 232 driven by a V-belt pulley 234 by a motor 236. The arbor shaft 232 is mounted upon suitable standards 240. Suitable speed control mechanism, not shown, is used to control the speed of the motor 236, so as to properly reel the sheet material.

As may best be seen by referring to Figure 3, the motor 68 is connected to the motor 34 in such a manner that the two motors are synchronized through the leads 250. Furthermore, a common switch and starter box 252 may be used to start both motors.

Modifications

The mandrels may be provided with a slight curvature, so that the sheet material has only a slight curvature. As far as the application of the reinforcing elements is concerned, the arrangement of the sheets is substantially equivalent to a pair of flat sheets laid side by side. This results in a jerky withdrawal of the reinforcing elements from the bobbins.

In the preferred modification disclosed in Figure 8, the sheets are withdrawn over a pair of flat rollers 400 from the rolls of sheet material 402 downwardly, so as to cause the two sheets to be folded and fed between the rollers 404 and 406, the sheet material, in passing from a flat position into a folded position passing through a zone where the sheets are curved so as to approach a circular shape. By folding the margins of one sheet towards the margins of the adjacent sheet, it can readily be seen that the two sheets cooperate to form a substantially circular contour in the vicinity of a zone 408. By mounting a mandrel 410 within the hollow of the two sheets and then wrapping the reinforcing elements around the sheets in this zone, it can readily be seen that the reinforcing elements will then be withdrawn from the bobbins at a substantially uniform rate of speed whenever the bobbin support 86 is rotated at a constant speed. The reinforcing elements extending between the two sheets may be severed by means of a motor driven cutter 420 and the sheets may be split along the fold by the motor driven rotary cutters 422. The halves of each sheet may then be rewound upon the rolls 424, there being four such rolls, two for each sheet. By this arrangement the reinforcing elements may be wrapped at a substantially uniform rate of speed around the two sheets, so as to withdraw the reinforcing elements from the bobbins at a substantially constant rate. In the preferred modification disclosed in Figure 8, the sheets have been severed before being rewound, so as to provide four rolls instead of two, as originally supplied to the device.

The mandrel 410 has been shown in Figure 13. It is preferably made from a flexible band 430, the contour of which may be adjusted by adjusting the threaded members 432 threadedly engaging the core member 434. By this arrangement, it can readily be seen that the contour of the mandrel may be adjusted to fit the inside contour of the sheets.

It is not necessary to split the sheets around the fold. Instead, the two sheets may be folded, as shown in Figure 9, and subsequently unfolded, so as to permit the two sheets to be rewound into two rolls.

When the sheet material is removed from the half round mandrel and laid flat, the reinforcing elements, in the absence of some type of control mechanism for guiding the reinforcing elements, will follow a slightly curved path across the sheet, due to the shape of the half round type mandrel, even though the reinforcing elements follow a horizontal path while being applied.

In order to cause the reinforcing elements to extend substantially straight as well as transversely across the sheet material, guide means may be used for deflecting the reinforcing elements, so as to compensate for curves, et cetera. A plurality of guide arms 436 (Figure 8), one for each of the bobbins, are pivotally mounted on the inner margin of members 86. Springs 438 bias the guide arms 436 downwardly. The arms slidingly engage a cam 440. The contour of the cam 440 permits the arms to be raised and lowered, so as to cause the reinforcing elements to be laid in a path substantially straight across the sheet material and shaped at the void positions between the two sheets to compensate for the helical winding so that ribbons will end up substantially perpendicular to the length of each sheet. The two sheets may be fed in an angular relation with respect to each other, so as to compensate for the helical path through which the reinforcing elements travel with respect to the sheet material, as will appear more fully in connection with the description of the modifications that will be described later.

It can readily be seen that the reinforcing elements or bobbins are, so to speak, helically wound on the sheet material. In other words, the reinforcing elements are inclined with respect to the longitudinal length of the sheet of material. For many purposes, this is not objectionable. For other purposes, however, the inclination of the reinforcing elements may be objectionable. In the modification disclosed in Figures 5 and 6, the two sheets are fed at an angle with respect to each other, so as to compensate for the inclination of the reinforcing elements, so that upon the reinforcing elements being wound in position, instead of being diagonally disposed, they extend transversely across the inclined sheets of material, which modification will now be described.

The sheets of material are fed through the ribbon wrapping mechanism at such an angle that the sheet material extends at right angles to the reinforcing elements as they are placed in position. This has been accomplished by mounting the rolls 280a and 280b on horizontally disposed axes 282, the two rolls being offset, as clearly shown in Figure 5. From the rolls the sheet material passes over a pair of frusto-conical idlers 284 supported upon suitable shafts 286 mounted in adjustably mounted bearings that have not been shown. Instead of utilizing one mandrel, as shown in the preferred embodiment, a pair of mandrels 290a and 290b have been used. These two mandrels are pivotally attached to each other at 292 and are angularly disposed. The angle may be adjusted by adjusting the brackets 294, each provided with a slot 296, through which passes a pair of bolts 298 for securing the brackets 294 to the standards 300 fixedly mounted in position upon the support or floor 302. Near the point where the two mandrels 290a and 290b are pivotally attached together, the wrapping mechanism, which is identical to that described in the preferred embodiment, is positioned, so as to wrap the reinforcing elements around the two sheets of material mounted upon the two mandrels.

As the sheet material advances beyond the point where the reinforcing elements are wrapped, the reinforcing elements are cut by the rotary cutters 170. The sheets may pass between driers, which have not been shown, downwardly over frustoconical idlers 310. The re-reeling mechanism has been shown schematically, in that the same mechanism may be used in connection with the preferred embodiment if so desired. As best seen in Figure 6, the sheet material may be advanced from the conical idlers 310, over rollers 312, to be rewound into rolls 313, only one of which has been shown.

The angle of the sheets of material may be adjusted by adjusting the supports that have not been shown for the rolls 280a and 280b, to adjust these rolls toward each other, so as to decrease the angle, or from each other, so as to increase the angle. The frustoconical rollers will then be adjusted accordingly and the mandrels 290a and 290b adjusted to the same angle. Furthermore, the position of the mandrels 290a and 290b and the pivotal mounting therefor, may be raised or lowered by adjusting the brackets 294 upwardly or downwardly on the standard 300, to thereby adjust the relative position of the mandrels with respect to the wrapping mechanism. The use of conical rollers or idlers 284 and 310 may be objectionable, especially if the rollers are rather large, in that it will necessitate slippage of the paper advancing over the conical rollers. If the conical rollers are found undesirable, rollers of uniform diameter or rods placed at the proper angles may be used in deflecting the paper to the proper angle.

Referring to the modification disclosed in Figure 11, an adhesive pot 350 mounted upon brackets 352 secured to the rotary gear 60 is positioned above the stationary overflow reservoir 360. A plurality of overflow pipes 362, only one of which has been shown, extends from the toroidal adhesive pot 350, so as to empty into the stationary reservoir 360. The adhesive pot 350 rotates with the gear. The adhesive pot 350 is provided with a plurality of apertures 364 for guiding the reinforcing elements 101 into the rotating adhesive pot 350. Eyes 366, one for each of the bobbins, are mounted near the bottom and towards one side of the adhesive pot 350, through which eyes the reinforcing elements pass. The margin of the adhesive pot 350 is provided with apertures 368 (Figure 12) through which the reinforcing elements 101 extend. A felt pad 370, secured to the top margin of the adhesive pot 350, cooperates with the margins of the apertures 368 to form a wiper for limiting the amount of adhesive material carried out by the reinforcing elements. The adhesive material is supplied to the revolving adhesive pot 350 by means of refill tubes 155 like those described in connection with the preferred embodiment. A plurality of valves 388 are mounted in the bottom of the adhesive pot for draining the adhesive from the adhesive pot into the reservoir 360 whenever a job is completed or for some other reason it is found desirable to drain the adhesive material from the adhesive pot 350. A drainage tube 380 may be a rubber tube as used in draining the reservoir 360.

From the foregoing, it can readily be seen that the reinforcing elements pass into the adhesive pot through apertures in the margin of the adhesive pot, pass through the eyes in the bottom of the adhesive pot and out again through apertures cooperating with the felt pad to limit the amount of adhesive carried out by the reinforcing elements. The eyes 366 function as agitators in the bottom of the adhesive pot 350.

In order to cure the adhesive material rapidly, it is well to heat the adhesive material either in advance of reaching the pot 350 or by heating the adhesive pot 350, to thereby heat the adhesive, or both. By preheating the adhesive and continuously circulating the adhesive or by heating the adhesive pot 350, it is possible to maintain the adhesive at the most desirable temperature. Furthermore, in order to heat the sheet material passing over the mandrel, heater elements 390 may be mounted in the mandrel 41 so as to heat the mandrel by means of electricity.

Instead of utilizing the felt pad wiper, as disclosed in Figure 12, a V-shaped guide could be used, through which the reinforcing elements pass, so designed that it would remove surplus adhesive material. The amount of adhesive material may be governed by the size and shape of the orifice or slot.

Instead of using a comparatively short mandrel, as disclosed in Figures 8 and 9, it may be desirable to provide a mandrel that supports the sheet material substantially the entire distance from the flat position to the folded position. A pair of mandrels 450 have been disclosed in Figures 14 to 18 inclusive. At the top, indicated by reference character 452, the mandrels are flat. Each mandrel 450 bulges outwardly, so that the center portion 454 is substantially semi-circular. At 456, near the bottom of the mandrels, the contour is substantially U-shaped in cross sectional area, as shown in Figure 18. Thus, two sheets of paper may be fed from a flat position into a circular form and then finally into a folded position.

It is quite desirable that the sheets be fed in a path such that the center of the sheets follow the center of the supporting mandrel. This may be done by various types of mechanism. As shown in Figures 14, 15 and 16, each of the mandrels 450 is provided with a longitudinally extending slot 460 through which feed pins 462 project. These feed pins 462 are fixedly mounted upon belts 464, passing over the pulleys 466 and 468. As the sheet material is fed over the mandrel, the pins 462, projecting outwardly through the slot 460, pierce or perforate the sheet material. Thus, the sheet material may be used to actuate the belts 464. The pins being guided in the slot 460 cause the sheet material to travel in a substantially straight path.

Due to the fact that the reinforcing elements are secured in position by adhesive material, which adhesive material may set more rapidly at temperatures above room temperature, heater elements 470 are mounted within the mandrel members 450. The heater elements, heating the inside of the mandrels, will raise the temperature of the sheet material, so that its temperature is higher than room temperature at the position where the reinforcing elements are applied. Furthermore, by causing the sheet material to travel over the heated mandrel beyond the position where the reinforcing elements are applied, the time required to set or dry the adhesive material may be shortened. The heater elements 470 have merely been shown for the purpose of illustration. Any type of heater elements may be used. For example, infra-red lamps may be used for heating the interior of the mandrel and the exterior of the sheets and reinforcing elements.

Guiding members, not shown, may be located on the outside of the mandrels to cause the sheet material to follow the exact contour of the mandrels.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a device for reinforcing sheet material, means for feeding the sheet material past a reinforcing station, rotatably mounted means having a spindle for supporting a bobbin of reinforcing material, means supporting said bobbin and its rotatable supporting means for rotation around said station to unwind said reinforcing material from said bobbin onto said sheet material, a toroidal adhesive pot having an annular opening encircling said station, said sheet material passing through said station, said adhesive pot having adhesive material therein, and means mounted upon said rotatably mounted supporting means for causing the reinforcing material withdrawn from the bobbin to pass through said annular opening and the adhesive material in the adhesive pot as the bobbin is rotated about the station.

2. In a device for use in reinforcing sheet material, the combination including a rotatable support adapted to receive sheet material therethrough and having a plurality of bobbins mounted thereon, each of said bobbins having wound thereon reinforcing elements adapted to be wrapped around the sheet material as the rotatable support is rotated, a toroidal adhesive pot mounted coaxially with said support, and guides mounted upon said rotatable support for guiding the reinforcing elements from the bobbins through the adhesive pot as the rotatable support is rotated to thereby cause the reinforcing elements to be coated with adhesive material in the adhesive pot while advancing from the bobbins to the sheet material.

3. In a device for use in reinforcing sheet material, the combination including a rotatable support adapted to receive said sheet material therethrough and having a plurality of bobbins mounted thereon, each of said bobbins containing reinforcing elements adapted to be wrapped around the sheet material when the rotatable support is rotated around the sheet material, a toroidal adhesive pot surrounding the path of travel of said sheet material and having an annular opening, guides mounted upon said rotatable support and adapted to extend into said annular opening to guide the reinforcing elements withdrawn from the bobbins through said annular opening and the adhesive material in the adhesive pot as the rotatable support is rotated to thereby cause the reinforcing elements to be treated with adhesive material while advancing from the bobbin to the sheet material, and means for metering the quantity of said adhesive carried by said elements from said pot.

4. In a device for use in reinforcing sheet material, the combination including a rotatable support adapted to receive said sheet material therethrough and having a plurality of bobbins mounted thereon, each of said bobbins containing reinforcing elements adapted to be wrapped around the sheet material when the rotatable support is rotated around the sheet material, a toroidal adhesive pot surrounding the path of travel of said sheet material and having an annular opening, guides mounted upon said rotatable support and adapted to extend into said annular opening to guide the reinforcing elements withdrawn from the bobbins through said annular opening and the adhesive material in the adhesive pot as the rotatable support is rotated to thereby cause the reinforcing elements to be coated with adhesive material while advancing from the bobbins to the sheet material, and means for adjusting said guides on said support between said position extending into said adhesive pot and a retracted position outward of said pot.

5. In a device for reinforcing sheet material, the combination including means for feeding the sheet material past a reinforcing station, said means including a pair of parallel feed rollers for withdrawing sheet material from two rolls of sheet material, said feed rollers being mounted in close proximity to each other so as to cause the sheet material to be withdrawn in two sheets in close proximity to each other past the reinforcing station, a second pair of feed rollers located on the opposite side of the reinforcing station, said last mentioned feed rollers having their axis of rotation extending in a direction at right angles to the axis of rotation of the first mentioned feed rollers, the two sheets of material being folded while passing through said second pair of feed rollers so as to cause the sheet material to pass from a flat sheet into a folded sheet, a curved mandrel supporting the interior of the sheets between said two pairs of feed rollers, and means for wrapping reinforcing material on the outer periphery of the sheet material while passing through the reinforcing station and over the mandrel.

6. In a device for reinforcing sheet material, means for feeding the sheet material past a reinforcing station, rotatably mounted means having a spindle for supporting a bobbin of reinforcing material, said bobbin and its rotatable supporting means rotating around said station, an adhesive pot mounted for rotation with the rotatable supporting means, said adhesive pot having adhesive material therein, and means mounted upon said rotatably mounted supporting means for causing the reinforcing material withdrawn from the bobbin to pass through the adhesive material in the adhesive pot as the bobbin is rotated about the station.

7. In a device for use in reinforcing sheet material, the combination including a rotatable support having a plurality of bobbins mounted thereon, means for feeding said sheet material through said support, each of said bobbins having wound thereon reinforcing elements adapted to be wrapped around the sheet material as the rotatable support is rotated, an adhesive pot mounted for rotation with the rotatable support, and guide means mounted upon said rotatable support for guiding the reinforcing elements from the bobbins through the adhesive pot as the rotatable support is rotated to thereby cause the reinforcing elements to be coated with adhesive material in the adhesive pot while advancing from the bobbins to the sheet material.

8. In a device for use in reinforcing sheet material, the combination including a rotatable support having a plurality of bobbins mounted thereon, means for feeding said sheet material through said support, each of said bobbins containing reinforcing elements adapted to be wrapped around the sheet material when the rotatable support is rotated around the sheet material, an adhesive pot mounted for rotation with the rotatable support, adjustable guide means for said reinforcing elements mounted upon said rotatable support, said adjustable guide means causing the reinforcing elements withdrawn from the bobbins to pass through the adhesive material in the adhesive pot as the rotatable support is rotated to thereby cause the reinforcing elements to be coated with adhesive material while advancing from the bobbin to the sheet material, means for adjusting said guide means between an operative position guiding said reinforcing elements through said adhesive material and a retracted position outward of said adhesive material, and means on said guide means outwardly of said pot for metering the quantity of said adhesive carried by said elements from said pot.

9. In a device for use in reinforcing sheet material, the combination including a rotatable support having a plurality of bobbins mounted thereon, means for feeding said sheet material through said support, each of said bobbins containing reinforcing elements adapted to be wrapped around the sheet material when the rotatable support is rotated around the sheet material, a toroidal adhesive pot mounted for rotation with the rotatable support, said adhesive pot encircling said sheet material and having an annular opening, and guides for said reinforcing elements mounted upon said rotatable support, said guides causing the reinforcing elements withdrawn from the bobbins to pass through said annular opening and the adhesive material in the adhesive pot as the rotatable support is rotated to thereby cause the reinforcing elements to be coated with adhesive material while advancing from the bobbins to the sheet material.

10. In a device for applying adhesive material to reinforcing elements to be wrapped on sheet material from a plurality of bobbins rotatably mounted, the combination including a substantially toroidal adhesive pot having an annular opening, the cross sectional area of the adhesive pot being substantially C-shaped so as to have a lip portion located above the adhesive material in the adhesive pot, means for rotating the adhesive pot in unison with the bobbins, a stationary toroidal overflow reservoir having an annular slot formed in the top, a conduit extending from the adhesive pot into the slot in said overflow reservoir, said conduit being mounted for rotation with the toroidal adhesive pot, the opening from the toroidal adhesive pot into the conduit being so positioned as to drain surplus adhesive material from the adhesive pot when the adhesive material is subjected to centrifugal force caused by rotation of the adhesive pot tending to cause the surface of the adhesive material to approach a vertical position, and means including a jet for supplying adhesive material to the adhesive pot through the annular opening.

11. In a device for applying adhesive material to reinforcing elements wrapped on sheet material from a plurality of bobbins rotatably mounted, the combination including a toroidal adhesive pot having a annular opening formed in the upper portion thereof, the cross sectional area of the adhesive pot being substantially C-shaped so as to have a lip portion located above the adhesive material in the adhesive pot, means for rotating the adhesive pot in unison with the bobbins, a stationary toroidal overflow reservoir having a larger overall diameter than the diameter of the adhesive pot and also having an annular opening formed in the upper portion thereof, the overflow reservoir being located below and outwardly from the toroidal adhesive pot, said toroidal overflow reservoir being arranged to receive surplus adhesive material that drains from said adhesive pot.

12. In a device for handling sheet material, the combination including means for feeding two sheets of material from two rolls, means for transforming each sheet from a flat state to a substantially half round state and continuing to transform the shape of each sheet from a half round to a folded state, the plane of each sheet when folded being at right angles to the plane of the sheets when flat at the beginning, and means for guiding the sheets and to provide a substantially half round periphery for each sheet at the approximate half way point.

13. In a device for combining reinforcing elements and sheet materials, the combination including means for feeding two sheets of material from two rolls of sheet material, the two sheets leaving the feeding means while flat, means for curving the sheets, said curving means including a pair of rollers feeding the sheets folded, a curved mandrel located between the sheet feeding means and the rollers for curving the sheets to support the interior of the sheets, and means for winding reinforcing elements upon the exterior of the sheets while said sheets are passing over the curved mandrel.

14. The method of handling sheet material including the steps of feeding two sheets of material over two rolls into substantially parallel paths, transforming each sheet from a flat state to a substantially half round state, the two sheets of material when in the half round state forming together a substantially cylindrical contour, and feeding the sheets from the half round state into a folded state wherein the plane of each sheet is substantially at right angles to the plane of the sheets when flat at the beginning.

15. The method of combining elongate reinforcing elements with sheet materials to be reinforced thereby which includes the steps of feeding two sheets from two rolls of the sheet material through substantially parallel paths, the two sheets leaving the rolls while flat, curving the sheets so that the contour of each sheet is substantially half round, the two sheets cooperating to form a substantially cylindrical contour, feeding the sheets from the half round sheet into a folded contour, said sheets when completely folded lying substantially at right angles to the plane of the sheets advancing into the two parallel paths, wrapping the reinforcing elements around the sheets of material while in said substantially cylindrical contour, and adhesively securing the reinforcing elements to the sheet material.

16. In a device for reinforcing a pair of sheets of material with transversely disposed reinforcing elements, the combination including a pair of mandrel members disposed at an angle with respect to each other, each of said mandrel members including a portion having a curved surface, means for feeding said sheets from a flat shape and causing said sheets to flow in contact with the curved portion of the mandrel, said mandrel members overlapping each other near the center thereof at an acute angle, the overlapping mandrel members cooperating to form a curved outer surface, and means for guiding one of said sheets along one of the mandrel members and the other sheet along the other mandrel member to cause the two sheets to travel in paths forming an acute angle with each other.

17. In a device for reinforcing a pair of sheets of material with transversely disposed reinforcing elements while the sheet material passes a reinforcing station, the combination including a pair of mandrel members angularly disposed with respect to each other, said mandrel members overlapping each other, the overlapping mandrel members cooperating to form a substantially curved outer surface, means for feeding one sheet to be reinforced in overlying relation along one of the mandrel members, and means for feeding the other sheet to be reinforced in overlying relation along the other mandrel member to cause the two sheets to travel in paths forming an acute angle with respect to each other with said mandrel members underlying said sheets at the reinforcing station to support the sheet material during reinforcement thereof.

18. In a device for reinforcing a pair of sheets of material with transversely disposed reinforcing elements wrapped around the reinforcing sheets at a reinforcing station, the combination of a pair of mandrel members having their longitudinal axes extending at an angle with respect to each other, said mandrel members overlapping each other at a position near the center thereof and underlying the reinforcing station, the overlapping mandrel members cooperating to form a curved outer surface, means for feeding one sheet to be reinforced along one of the mandrel members, means for feeding the other sheet to be reinforced along the other mandrel member, means for wrapping the reinforcing elements in helices on the sheets of material with said reinforcing elements extending through helical paths, the longitudinal axis of one sheet being substantially normal to the plane passing through three points of that portion of a helix located on said sheet, the longitudinal axis of the other sheet being substantially normal to the plane passing through three points of that portion of a helix located on said other sheet.

19. In a method for continuously combining a narrow elongate reinforcing element with wide sheet material which comprises moving a supply package of the reinforcing element continuously in a circuitous path in one plane, moving two sheets of the wide sheet material continuously at angles approaching 90° to the first plane and with said sheets moving through the space that is circumscribed by a path along which the package of reinforcing element moves, forming the sheets to a specific substantially round contour in the region where the reinforcing element is applied thereto with said contour resulting from transforming each of the two sheets of material from a flat condition to a half round and thence to a folded condition and in which the reinforcing element is guided to follow a path such that after combining the element with the sheet material and when sheet material is spread out flat the reinforcing element lies in a straight line and in which the two sheets of material are tilted in relation to each other such that the reinforcing element can be placed on the two sheets of material so as to lie perpendicular to their length, said method being characterized by combining the reinforcing element with the sheets of material by helically winding the reinforcing element around two sheets of material so that the reinforcing element lies perpendicular to the length of the sheet material.

20. In a device for reinforcing sheets of material with transversely disposed reinforcing elements, a pair of mandrel members disposed at an angle with respect to each other, said mandrel members overlapping each other near the center, the overlapping mandrel members cooperating to form a substantially oval outer surface, means for feeding a sheet to be reinforced along one of the mandrel members and means for feeding another sheet to be reinforced along the other mandrel member to cause the two sheets to travel in paths forming an acute angle.

21. In a device for reinforcing sheet material, the combination including means for feeding a pair of sheets of material in separate paths, the paths being angularly disposed with respect to and crossing each other, and a pair of mandrels, one of which underlies one sheet of material and extends parallel to its path of travel, the other mandrel underlying the other sheet of material and extending parallel to its path of travel, and means supporting said mandrels in crossed relation inwardly of the crossing portions of said sheets.

22. In a device for reinforcing sheet material, the combination including means for feeding a pair of sheets of material in separate paths, the paths being angularly disposed with respect to and crossing each other, a pair of mandrels, one of which underlies one sheet of material and extends parallel to its path of travel, the other mandrel underlying the other sheet of material and extending parallel to its path of travel, means for adjusting the angles of the paths of travel of the two sheets, and means for adjusting the angular position of the mandrels, and means supporting said mandrels in crossed relation inwardly of the crossing portions of said sheets.

23. In a device for reinforcing sheet material, the combination of means for feeding a pair of sheets of material from a flat position into a folded position such that the sheets in passing from the flat position to the folded position form a substantially circular surface, means for supporting the sheet material in the substantially circular shape, the longitudinally disposed center lines of the two sheets forming an acute angle, annular means for supporting a plurality of bobbins of reinforcing material, said annular means extending around the portions of the sheets that are substantially circular in shape, means for rotating the annular means for causing the reinforcing material to be wrapped around the sheet material while in the substantially circular shape, and means for correlating the rate of advancement of the sheets with the rate of rotation of the bobbins to cause the reinforcing elements to extend substantially perpendicular to the adjacent margin of the sheet over one-half of the sheet while the reinforcing elements over the other half of the sheets form an acute angle with the margin of the sheet.

24. In a method for continuously combining narrow reinforcing elements with wide sheet material in which supply packages of reinforcing elements are rotated in one plane and in which reinforcing elements are wound onto the outer surfaces of the two sheets of material which continuously advance in a plane approaching 90° to the first plane and with said sheets moving through a space that is circumscribed by a path along which the packages of reinforcing elements move and in which the sheets of material have a substantially round contour at the combining station with said contour resulting from transforming each of the two sheets of material from a flat condition to a half round and thence to a folded condition and in which the reinforcing elements, after combining and when the two sheets of material are spread out flat, lie in a substantially straight line and perpendicular to the first half of each sheet, but lie in a substantially straight line that forms an acute angle to the longitudinal edge of each sheet on the second half of each sheet and in which the relation of the angle of the reinforcing elements to the edges of the sheets of material results from the contour of the two sheets acting together as described, said method being characterized by reinforcing the sheets of material with the reinforcing elements by helically winding the reinforcing elements around the two sheets of material advancing in diverging paths while in a curved state past the reinforcing elements being wound.

25. Apparatus for fabricating reinforced sheet material comprising means for continuously advancing a web of said sheet material through a work station, a supply source of reinforcing material, means forming a supply of adhesive at a location intermediate said supply source and said station, means for guiding said reinforcing material from said supply source through said adhesive supply, and means for wrapping said adhesively treated reinforcing material around said web at said station while maintaining the path of movement of said adhesively treated reinforcing material substantially in a plane transverse of the direction of advance of said web to cause said reinforcing material to adhere to said web and to lie thereon substantially transversely of the length thereof.

26. Apparatus for fabricating reinforced sheet material comprising means for continuously advancing a web of said sheet material through a work station, a supply source of reinforcing material, means forming a supply of adhesive at a location intermediate said supply source and said station, means for rotating said supply source around said work station in a path defining a plane substantially transverse of the direction of advance of said web to cause said reinforcing material to wrap around said web and to lie thereon substantially transversely of the length thereof, and means for guiding said reinforcing material from said supply source through said adhesive supply prior to contact thereof with said web to cause said reinforcing material to adhere to said web.

27. Apparatus for fabricating reinforced sheet material comprising means for continuously advancing a plurality of webs of sheet material through a work station, means at said station for supporting the inner surfaces of said webs in spaced relation during passage of said webs through said station, a supply source of reinforcing material, means forming a supply of adhesive adjacent said station, means for rotating said supply source around said work station, in a path defining a plane substantially transverse of the direction of advance of said webs to cause said reinforcing material to wrap around the outer surface of said webs and to lie thereon substantially transversely of the lengths thereof, and means for guiding said reinforcing material from said supply source through said adhesive supply prior to contact thereof with said webs to cause said reinforcing material to adhere to said webs.

28. The method of fabricating reinforced sheet material which comprises the steps of continuously advancing a web of sheet material through a work station, feeding reinforcing material from a supply source thereof to said work station, treating said reinforcing material with adhesive at a location intermediate said supply source and said work station, and wrapping said adhesively treated reinforcing material around said web at said station while maintaining the path of movement of said wrapping reinforcing material at an acute angle to a line perpendicular to the direction of the advance of said web to cause said reinforcing material to adhere to said web and to lie thereon substantially transversely of the length thereof.

29. The method of fabricating reinforced sheet material which comprises the steps of continuously advancing a web of sheet material through a work station, feeding reinforcing material from a supply source thereof to said work station, treating said reinforcing material with adhesive at a location intermediate said supply source and said work station, and rotating said supply source around said work station in a path substantially transverse of the direction of advance of said web to cause said reinforcing material to wrap around and adhere to said web and to lie thereon substantially transversely of the length thereof.

30. The method of fabricating reinforced sheet material which comprises the steps of continuously advancing a plurality of webs of sheet material through a work station, supporting the inner surfaces of said webs at said station, feeding reinforcing material from a supply source thereof to said station, treating said reinforcing material with adhesive at a location intermediate said supply source and said station, and wrapping said adhesively treated reinforcing material around the outer surfaces of said webs at said station while maintaining the path of movement of said wrapping reinforcing material substantially transverse to the direction of the advance of said webs to cause said reinforcing material to adhere to said outer surfaces and to lie thereon substantially transversely of the length thereof.

31. The method of fabricating reinforced sheet material which comprises the steps of continuously advancing a plurality of webs of sheet material through a work station, supporting the inner surfaces of said webs at said station, feeding reinforcing material from a supply source thereof to said station, treating said reinforcing material with adhesive at a location intermediate said supply source and said station, and rotating said supply source substantially around said station in a path substantially transverse of the direction of advance of said webs to cause said reinforcing material to wrap around and adhere to the outer surfaces of said webs and to lie thereon substantially transversely of the lengths thereof.

32. Apparatus for fabricating reinforced sheet material comprising means for continuously advancing a web of said sheet material through a work station, a supply source of reinforcing material, means for rotating said supply source around said work station in a generally circular path defining a plane substantially transverse of the direction of advance of said web to cause said reinforcing material to wrap around said web and to lie thereon substantially transversely of the length thereof, means providing a supply of adhesive adjacent said station, means for causing said adhesive supply to rotate coaxially with said supply source and at substantially the same angular rate, and means for guiding said reinforcing material from said supply source through said rotating adhesive supply prior to contact thereof with said web to cause said reinforcing material to adhere to said web.

33. The method of fabricating reinforced sheet material which comprises the steps of advancing a web of sheet material through a work station, feeding reinforcing material from a supply source thereof to said work station, treating said reinforcing material with adhesive, and applying said adhesively treated reinforcing material to said web at said station while providing a path of movement of said reinforcing material at an acute angle to a line perpendicular to the direction of the advance of said web to cause said reinforcing material to adhere to said web and to lie thereon substantially perpendicular to the length thereof.

34. The method of making reinforced sheet material, consisting in withdrawing strand material from supply packages thereof, guiding said strand material into moistening relationship with an adhesive supply, winding said adhesively moistened strand material about longitudinally moving webs of material so as to lie on the webs transversely to the movement of said webs, limiting said adhesive to the strands and to the area of contact between said strands and said webs, and drying said adhesive to bond the strand and web materials.

35. In a device for use in transversely reinforcing sheet material advancing along a path, the combination including a rotatable support having a bobbin mounted thereon, said support being adapted to receive sheet material therethrough, said bobbin containing reinforcing elements adapted to be wound around said sheet material and to be adhesively bonded thereto when said rotatable support is rotated around said advancing sheet material, an adhesive tank with an adhesive supply therein adapted for rotation with said rotatable support, the movement of said tank describing a path of travel surrounding said sheet material, guide means adapted for rotation with said rotatable support to guide the reinforcing elements withdrawn from said bobbin so as to adhesively treat said elements after said elements leave the bobbin but before said elements are wound around said sheet material.

36. In a device of the class described, the combination of a toroidal adhesive pot having an annular opening formed in an upper portion thereof toward the central axis of the pot, said adhesive pot being adapted for holding adhesive material, guide means projecting through the opening to guide members through said adhesive, and means rotatably supporting said guide means and adhesive pot for rotation as a unit about the central axis of said adhesive pot.

37. An adhesive pot generated by a substantially C-shaped generatrix traveling through a circular path in a horizontal plane with the C being open toward the center of the path, the C being slightly tilted outwardly from said axis so that one edge of the opening of the adhesive pot is located substantially above the transverse centerline of the adhesive pot and the other edge is located near the centerline on the inner side of the adhesive pot.

38. In a method for continuously combining narrow strip material with wide sheet material by adhesive which comprises; moving a supply package of the strip material in a circuitous path in a first plane, continuously moving two sheets of the wide sheet material in a plane disposed at 90° to said first plane and through the space around which the said supply package moves in its circuitous path, bringing the strip into contact with the sheet material and preventing relative movement between the sheet material and the strip material at the point of contact thereof, whereby as the supply package rotates and the sheet material moves, the strip will be wound about the sheet material and adhesively connecting the strip to the sheet material.

39. In a method for continuously combining narrow strip material with wide sheet material which comprises; moving a supply package of strip material continuously in a circuitous path in a first plane, moving two sheets of the wide sheet material continuously in a plane disposed at 90° to the first plane and through the space that is circumscribed by the path along which the package of strip material moves, guiding and supporting the two sheets of material in the region of said first plane to form a substantially round contour of the sheets as they pass through said first plane, winding the strip material about the two sheets during continued movement of the supply package and the sheets, folding the sheets in half after they pass beyond the region of said first plane, and adhesively connecting the strip material to the sheet material.

40. In a method for continuously combining narrow strip material with wide sheet material which comprises; moving a supply package of strip material continuously in a circuitous path in a first plane, moving two sheets of material continuously in a plane approaching 90° to the first plane and through the space that is circumscribed by the path along which the package of strip material moves, supporting and guiding said sheets so they are transformed from a flat condition as they approach said first plane into a rounded condition concave toward each other as they pass through said plane and then folding each sheet in half in a single plane with the folded side of each sheet being on the side thereof opposite the other sheet, winding the strip material about the two sheets during continued movement of the supply package and the sheets, and adhesively connecting the strip material to the sheet material.

41. A method of continuously advancing two sheets of material longitudinally and under tension while maintaining the sheets free of distortion which comprises moving the sheets while transforming the sheets from a flat state to a substantially half circular shape and then folding each sheet in half, accomplishing the transformation of the sheet in a distance about three times as great as the width of each of the sheets and during the transformation continuously maintaining the side edges of each sheet about a constant distance from the respective edges of the other sheet.

42. A method of making transversely reinforced paper by combining reinforcing elements with sheet material by helically winding the reinforcing elements around two sheets of material which comprises; rotating supply packages of reinforcing elements in a first plane and in which plane the reinforcing elements are wound onto the outer surfaces of two sheets of material, advancing the material in a plane approaching 90° to the first plane through a space that is circumscribed by the path along which the packages of reinforcing elements move, forming the sheets of material to a specific substantially round contour in a region including said first plane at the combining station, said contour resulting from the steps of moving the two sheets of material while transforming the sheets from a flat condition to an approximately half round condition with the half round sheets concave toward each other, and then folding the sheets in half and accomplishing the transformation of the sheets from flat condition to folded in a distance about three times as great as the width of either of the sheets.

43. Apparatus for fabricating reinforced sheet material comprising means for guiding a web of said sheet material through a work station at a predetermined angle to the axis of the work station, a supply source of reinforcing material movable in a circuitous path about the work station in a plane normal to said axis, said reinforcing material being wound about the sheet material during continued movement of the supply source and sheet material, means for driving the sheet material at such a rate that the reinforcing material extends transversely across one face thereof, and means for adhesively connecting said reinforcing material to said one face of the sheet material.

44. In a device for reinforcing sheet material, means for feeding said sheet material past a reinforcing station, support means rotatably mounted for rotation around said station in a plane substantially perpendicular to the plane of movement of the sheet material adapted for supporting a supply of reinforcing material whereby said reinforcing material will be wound around said station by rotation of said support means, and means for applying adhesive to said reinforcing material after said reinforcing material leaves said reinforcing material supply source for bonding said reinforcing material to said sheet material at said reinforcing station.

45. In a device for reinforcing sheet material, means for feeding the sheet material past a reinforcing station, support means mounted for rotation about the sheet material at said reinforcing station adapted for supporting a supply package of reinforcing material whereby said reinforcing material will be wound about said sheet material during continued movement of the sheet material and said support means, adhesive supply means, and means guiding said reinforcing material into operative relation with said adhesive supply means during rotation of said support means, whereby the reinforcing material is adhesively wet when it is wound about said sheet material and thus adheres thereto.

46. The method of making reinforced sheet material which comprises; withdrawing strand material from a supply package thereof, winding the strand material about a plurality of longitudinally moving webs of sheet material so that the strand material lies substantially transversely across one face of each of the said webs, and adhesively bonding the strand material to said webs.

47. A method of combining reinforcing elements with sheet materials according to claim 15 which includes the step of severing the reinforcing elements between the edges of the sheets after the elements have been applied to the sheets, whereby the two sheets are freed of any connection with each other.

48. A method according to claim 38 which includes the step of severing the strip material between the sheets of wide sheet material after the strip material has been bonded thereto, thereby to separate the two sheets.

49. A method according to claim 30 which includes the step of severing the reinforcing material between the edges of adjacent of said webs of sheet material after the reinforcing material has been adhered thereto, thereby to separate the said webs.

50. A method according to claim 40 which includes the step of severing the strip material between the adjacent edges of the two sheets after the strip material has been adhesively connected to the sheet material, thereby to separate the two sheets.

51. A device according to claim 13 which includes cutting means adjacent the said pair of rollers for severing the reinforcing elements where they extend between said sheets, thereby to separate said sheets.

52. A device according to claim 16 which includes cutting means located in the region of the center of said mandrel members, extending between the edges of said pairs of sheet material for severing the reinforcing elements after they have been applied to said sheets of material, thereby to separate said sheets.

53. The method of making reinforced sheet material, consisting in withdrawing strand material from supply packages thereof, guiding said strand material into moistening relationship with an adhesive supply, winding said adhesively moistened strand material about longitudinally moving webs of material so as to lie on the webs transversely to the movement of said webs.

54. In a device for applying reinforced strand material to sheet material; means to feed the sheet material in one direction, means to rotate a supply of the strand material about the moving sheet material in a plane substantially perpendicular to the said one direction to wind the strand material about the sheet material, guide means supporting the strand material between the said supply thereof and the sheet material, means for moving said guide means in the said one direction during application of the strand material to one face of the sheet material whereby the strand material will extend substantially transversely of the sheet material, and means for adhesively bonding the strand material to the sheet material.

55. In a device for applying reinforced strand material to sheet material; means for feeding a plurality of webs of the sheet material in one direction, means for supporting and rotating a supply of the strand material about the said webs in a plane substantially perpendicular to said one direction to wind the strand material about the said webs so that it lies on one face of each thereof, guide means supporting the strand material between the said supply thereof and the said webs, means for moving said guide means in the said one direction during the application of the strand material to the said one faces of the webs whereby the strand material will extend substantially transversely of the webs, and means for adhesively bonding the strand material to the said webs.

56. A device according to claim 55 in which supporting mandrel means are provided for supporting the said webs in the region of the application thereto of said strand material so that the said webs are concave toward the center of rotation of the supply of strand material.

57. A device according to claim 56 in which the means for adhesively bonding the strand material to the sheet material comprises adhesive applying means associated with the strand material between the supply thereof and said webs operable for adhesively wetting the strand material before it reaches said webs.

58. A device according to claim 55 in which the means for moving said guide means comprises a cam having cam rises thereon engaging the guide means to move the guide means in the said one direction while the strand material is being applied to the said one face of each web, said cam having falls thereon for movement of the said guide means in the opposite direction in the interval during which the strand material has left one web and is approaching the next thereof.

59. A method of making transversely reinforced sheet material which comprises the steps of advancing a web of the sheet material in one direction through a work station, rotating a supply of reinforcing strand material about said web at said work station in a plane substantially perpendicular to the said one direction while withdrawing the strand material from the said supply and winding it about said web, engaging the strand material between the said supply thereof and said web, and moving the strand material at the said point of engagement thereof in the said one direction during the application of the strand material to one face of the web whereby the strand material will extend transversely across the web, and adhesively bonding the strand material to the said one face of the web.

60. A method of making a transversely reinforced sheet material which comprises the steps of advancing a plurality of webs of the sheet material in adjacent relation in one direction through a work station, rotating a supply of reinforcing strand material about the said webs at said work station in a plane substantially perpendicular to the said one direction while withdrawing the strand material from the supply thereof and winding it about said webs so as to lie on one face of each thereof, engaging the strand material between the supply thereof and the said webs, moving the strand material at the point of engagement thereof in the said one direction during the application of the strand material to the said one face of each web whereby the strand material will extend transversely of each web, and adhesively bonding the strand material to the webs.

61. A method according to claim 60 which includes the step of supporting the webs at the work station so as to be concave toward the center of rotation of the said supply of reinforcing strand material.

62. A method according to claim 61 in which the adhesive bonding of the reinforcing strand material to the said webs is accomplished by adhesively wetting the strand material during its travel between the said supply thereof and the said webs.

63. A method according to claim 62 which includes the step of severing the strand material between the webs after a strand material has been bonded thereto thereby to separate the webs from each other.

64. In a method for continuously combining narrow strip material with a plurality of wide sheets of material which comprises; moving a supply package of strip material in a circuitous path in a first plane, moving a plurality of sheets of the wide strip material continuously in paths disposed at substantially 90° to said first plane and through the space that is circumscribed by the path along which the package of strip material moves, guiding the plurality of sheets of material so their edges form acute angles with a line perpendicular to said first plane, winding the strip material about the sheets during continued movement of the supply package and the sheets, and driving the sheets at such a rate that the reinforcing strip material is applied across one face of each sheet substantially perpendicular to the length of said sheets.

65. A method according to claim 64 in which there are a plurality of the said supply packages supported in spaced relation about said circuitous path, with each thereof supplying strip material to the said wide sheets of material.

66. A method according to claim 64 which includes the step of adhesively bonding the strip material to the sheet material.

67. A method according to claim 66 in which the said sheet material is supported during its travel in the region of said first plane so as to be concave toward the center of said circuitous path.

References Cited in the file of this patent

UNITED STATES PATENTS

| | | |
|---|---|---|
| 928,385 | Huxley | July 20, 1909 |
| 970,203 | Ferranti | Sept. 13, 1910 |
| 1,192,017 | Subers | July 25, 1916 |
| 1,195,951 | Harrison | Aug. 22, 1916 |
| 1,850,301 | Gibbs | Mar. 22, 1932 |
| 1,894,219 | Gibbs | Jan. 10, 1933 |
| 1,923,710 | Collings et al. | Aug. 22, 1933 |
| 1,942,354 | Collings et al. | Jan. 2, 1934 |
| 1,974,453 | Gallaudet | Sept. 25, 1934 |
| 1,974,594 | Angier | Sept. 25, 1934 |
| 2,059,404 | Skedgell | Nov. 3, 1936 |
| 2,076,343 | Humphner | Apr. 6, 1937 |
| 2,264,305 | Gibbs | Dec. 2, 1941 |
| 2,542,139 | Holland | Feb. 20, 1951 |
| 2,575,666 | Knudson | Nov. 20, 1951 |
| 2,604,424 | Mathes | July 22, 1952 |